United States Patent

[11] 3,540,783

[72] Inventor Sylvester R. Cudnohufsky
 1290 Lake Angelus Shore Drive, Pontiac,
 Michigan 48055
[21] Appl. No. 806,886
[22] Filed March 13, 1969
[45] Patented Nov. 17, 1970

[54] HYDROSTATIC BEARING SYSTEM
 20 Claims, 7 Drawing Figs.
[52] U.S. Cl. .................................................. 308/9
[51] Int. Cl. ............................................. F16c 17/16
[50] Field of Search ........................................ 308/9, 160,
 103; 137/108

[56] References Cited
 UNITED STATES PATENTS
 2,578,712 12/1957 Martellotti ................... 308/122

Primary Examiner—Fred C. Mattern, Jr.
Assistant Examiner—Frank Susko
Attorney—Barnes, Kisselle, Raisch & Choate ABSTRACT: A hydrostatic bearing system comprising a pair of parts having adjacent surfaces with at least one of the surfaces having a plurality of spaced pressure pads or recesses therein. A positive displacement flow dividing and proportioning apparatus comprises a plurality of intercoupled pump motors connected to the pressure pads. The pump motors have a common inlet and the outlet of respective pump motors are connected to the pressure pads.

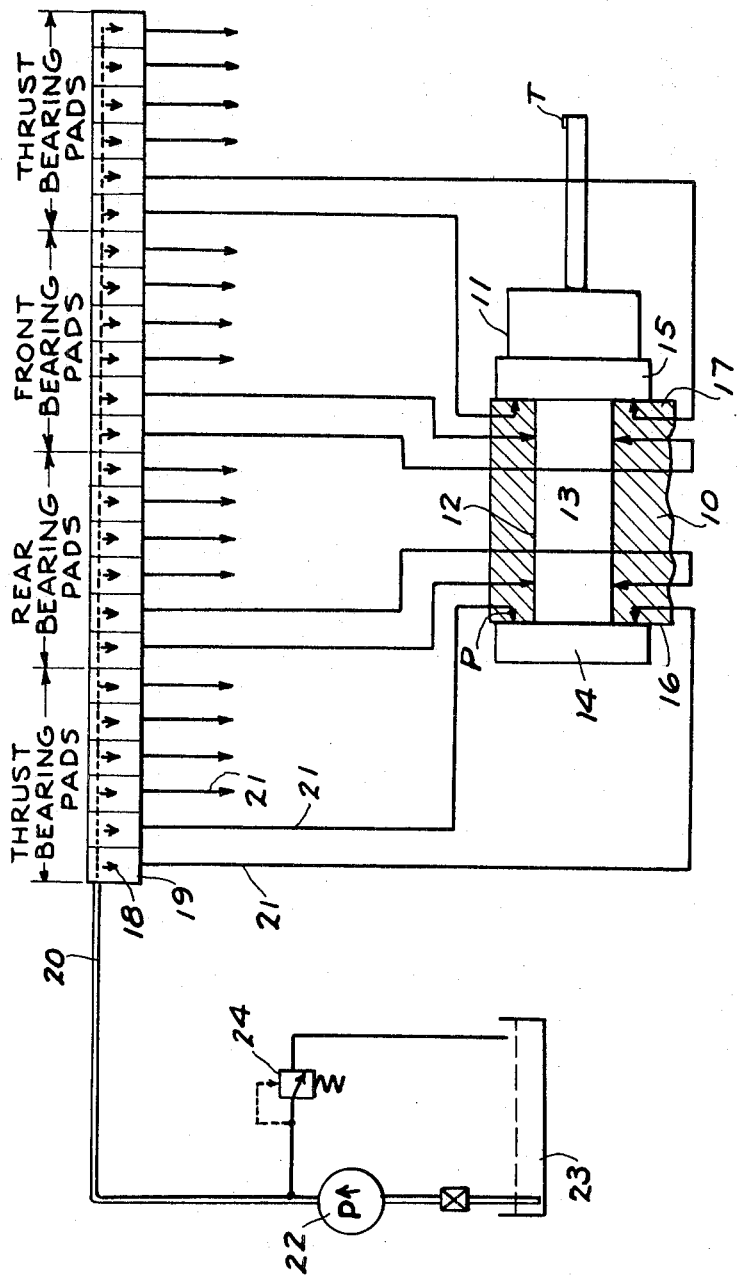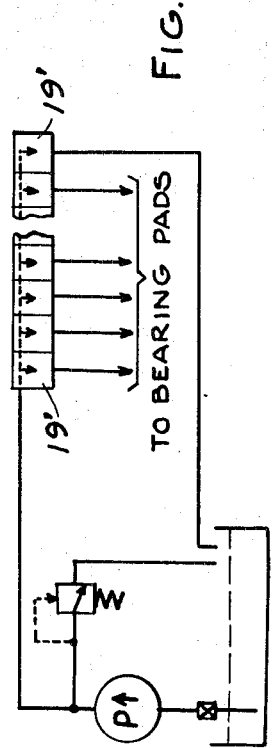
INVENTOR.
SYLVESTER R. CUDNOHUFSKY
BY
Barnes, Kisselle, Raisch & Choate
ATTORNEYS Patented Nov. 17, 1970 3,540,783

INVENTOR.
SYLVESTER R. CUDNOHUFSKY
BY
Barnes, Kisselle, Raisch & Choate
ATTORNEYS

HYDROSTATIC BEARING SYSTEM

This invention relates to hydrostatic bearing systems.

BACKGROUND OF THE INVENTION

One common type of bearing system comprises the use of a plurality of spaced pressure pads or recesses in association with one of the surfaces of a pair of adjacent surfaces and the supplying fluid under pressure through respective restrictors to the pressure pads so that a thin film of fluid flows between the surfaces. One of the problems of such systems is that load and temperature variations vary the flow requirements so that the system is not readily adaptable to wide variations in loading and temperature, unless excess capacity is available, which is expensive.

Another problem associated with most hydrostatic bearing systems is that each pad is provided with a restrictor. These elements, whether capillary, orifice or flow control have many disadvantages. Capillaries and orifices plug up easily and are not particularly linear in their pressure response as a function of gap. Flow controls are slow in response, have moving parts and are very expensive and cumbersome to install besides providing a place for an inexperienced operator to adjust the system badly, perhaps even to the point of damaging it. All of these devices produce a considerable static pressure drop (on the order of 50 percent of applied pressure) which amounts to energy being thrown away—the system stiffness must be decreased in order to obtain a stable bearing. All of these methods of compensation require either intricate machining in what is usually a confined space or considerably increased piping complexity. Finally, the use of any sort of restrictor implies problems of accessibility for cleaning and maintenance. This may be very difficult in confined spaces.

SUMMARY

Basically, the hydrostatic bearing system comprises utilization of a set of positive displacement geared pump motors mechanically connected in tandem (that is with a common main shaft) and with the output of each motor respectively connected to the pressure pads. The pump motors have a common fluid pressure inlet. Fluid is supplied under pressure to the pump motors and they operate, because of the positive displacement characteristic of each section, to provide equal volumes to the pressure pads. The interconnection of the pump motors is such that the pressure at which the equal volumes are supplied is automatically regulated in accordance with the spaces between the bearing surfaces.

DESCRIPTION OF THE DRAWINGS

FIG. 1 is a schematic diagram of a hydrostatic bearing system embodying the invention.

FIG. 2 is a schematic diagram of a modified form of the system.

DESCRIPTION

Figure 4:
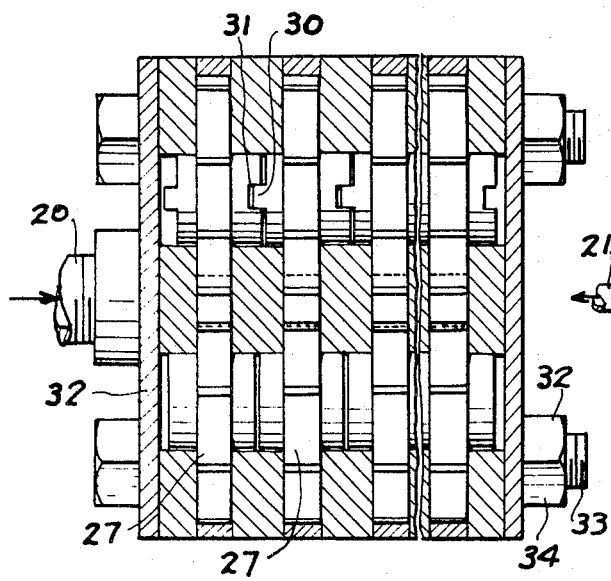
FIG. 4 is a longitudinal sectional view through a portion of the proportioning apparatus utilized in the system.

Referring to FIG. 1, the hydrostatic bearing system is shown in connection with a spindle that includes a base or housing 10 and a rotor 11. The base 10 has a cylindrical opening 12 therein in which the corresponding cylindrical portion 13 of the rotor is rotated. The rotor further has radial flanges 14, 15 with surfaces abutting surfaces 16, 17 of the base.

The surfaces 12, 16 and 17 of the base have circumferentially spaced pressure recesses or pads therein, the surface 12 having two sets of such circumferentially spaced recesses or pads which are designated for purposes of convenience by arrows in the drawings, in accordance with conventional practice.

In accordance with the invention, a proportioning apparatus 18 is provided in connection with each set of circumferentially spaced pressure pads. The proportioning apparatus 18 functions to divide and proportion the flow to the pressure pads P in any set of pressure pads. The apparatus 18 comprises a plurality of units 19 which, as presently described, comprises gear pump motors having a common inlet 20 and individual outlets 21 to their respective pressure pads. The common inlet 20 extends to a pump 22 that draws liquid from a tank 23. The pump is provided with a pressure relief valve 24.

Figure 5:
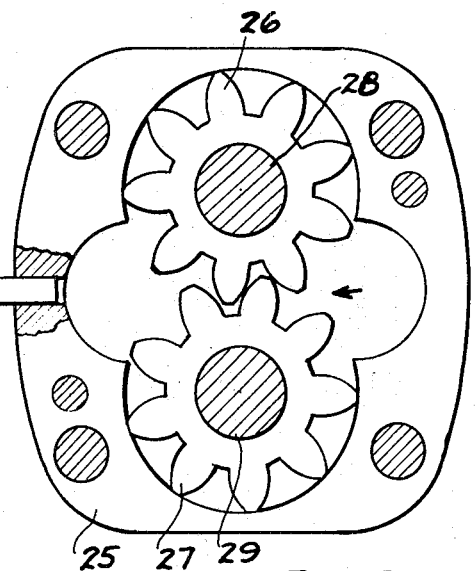
FIG. 5 is a side sectional view of a portion of the system.
Figure 6:
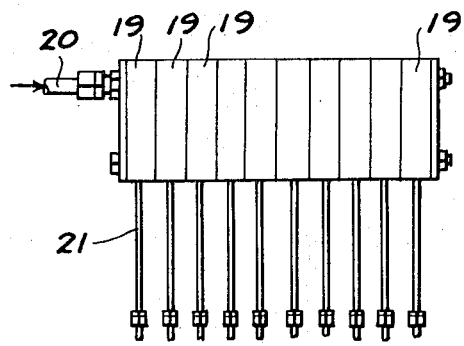
FIG. 6 is a side elevational view of a plurality of units utilized in the system, as they are interconnected.

Referring to FIGS. 4—6, each of the gear pump motors 19 comprises a housing 25 in which gears 26, 27 are rotatably mounted. The gears 26, 27 are fixed on hubs 28, 29 that have intercoupling portions 30, 31 (FIG. 4) so that corresponding gears 26, 27 are interconnected and rotate together. Thus, when fluid is supplied through inlet 20, it will cause a rotation of the gears or impellers and will flow out of each unit to the respective outlets 21. End plates 32 are provided on the outer surfaces of the endmost units and bolts 33 and nuts 34 assemble a plurality of the units as required into a compact device. A proportioning apparatus for dividing and proportioning flow is presently being sold under the trademark "Proportionator" by Mechanical Tool & Engineering Co., of Rockford, Illinois.

OPERATION

In operation, fluid is supplied under pressure from the pump 22 to the units 19 which function to divide and proportion the flow of fluid in equal volumes to each of the pressure pads. Pressure compensation due to variations in the gap between surfaces is obtained by the functioning of each unit 19 to produce a constant volume of flow as the gap varies between the surfaces corresponding to the particular pressure pad.

If the gap is large because of no loading on the system, then the unit 19 need only generate the constant volume at a small pressure to produce the necessary volume flow, while if the gap is small because of loading, the unit 19 must automatically generate a high pressure in order to force the required volume through the smaller gap. As is well known in hydrostatic bearing systems, when the gap at one of a circumferentially spaced set of pressure pads is decreased, an opposing gap is increased producing a net force tending to return the parts to their original position.

It can be seen that the system thus avoids the use of restrictors making it more sensitive to variations in loading and temperature and avoiding the problems of restrictors such as plugging and the like.

MODIFICATIONS

Figure 3:
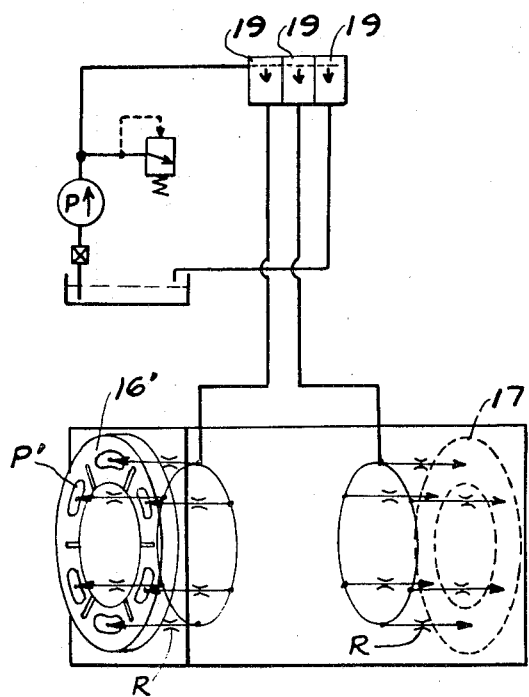
FIG. 3 is a schematic diagram of a further modified form.

In the form of the invention shown in FIG. 2, one of the proportioning units 19' is connected directly to drain so that it functions as a pure hydraulic motor. This tends to improve the response speed and prevents pump pulsations from affecting the hydrostatic bearing system.

Where certain sections of a bearing are always (or at all important times) exposed to the same and usually predictable force components, it is possible to utilize one unit 19 in connection with a plurality of pressure pads. Thus, as shown in FIG. 3, in connection with the radial surfaces 16', 17' of the bearing of FIG. 1, the pressure pads P' are connected in parallel to a single unit 19. However in such a form, a restrictor R must be associated with each pressure pad.

Thus, if for instance, the bearing in question is a spindle bearing performing a boring operation, it will always be exposed to axial thrust in one direction, such as might tend to increase the load on face 16', while decreasing that on face 17. In this case, the load on all pads in face 16' would increase simultaneously; that is the gap at all pads in this face would decrease and the flow would also tend to decrease. However, this being a positive-displacement feeding device, the flow cannot decrease—it is held constant by the displacement of its respective ring. Therefore, the pressure must increase. The pressure on all pads 17 will, correspondingly, decrease. Thus the proportionator compensates for gross load changes, while the individual pad restrictors (indicated as fixed flow controls R in FIG. 3) compensate for local changes.

Figure 7:
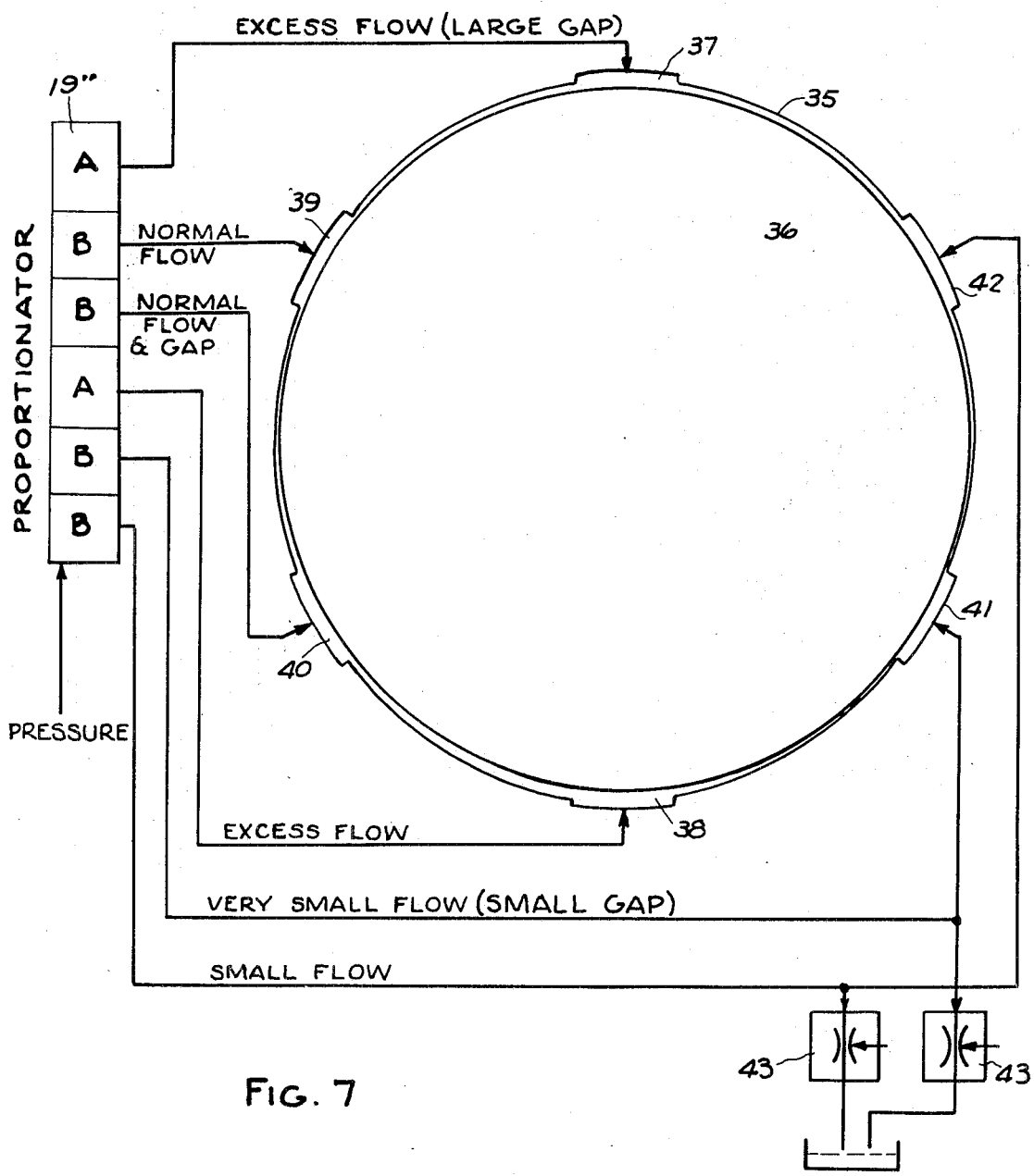
FIG. 7 is a diagrammatic view of a modified form of the invention.

The form of the invention shown in FIG. 7 is directed to an arrangement wherein one of the parts of the bearing is inaccurately formed. Thus as shown in FIG. 7, the outer part or housing 35 is not perfectly circular with respect to the inner member 36 so that pressure pads 37, 38 are spaced from the periphery of the member 36 greater distances than pads 39, 40 while pads 41, 42 are spaced lesser distances from the periphery of member 36.

As in the previous forms of the invention, a proportionator unit 19'' is associated with each pressure pad. However the proportionator units are of different sizes designated A and B, units A having a greater output than units B. The size is selected in order to produce the desired rate of flow. A compensated flow control valve 43 is associated with each of the circuits supplying the pads 41, 42 which are spaced more closely to the periphery of member 36 and the remaining pads.

In the case of the two pads which require unusually small flow, the flow control valves 43 are effectively set up to bypass the pockets 41 and 42. That is, the proportionator delivers a fixed amount of oil but, because the hydraulic resistance to the tank is decreased by the flow control, the pressure output of the proportionator is also decreased. Since, with the small gap, the proportionator by itself will automatically deliver excessive pressure, it can be seen that the action of the bypass valve is to adjust the output pressure to a "balanced" value, that is to a value close to that of the other pad pressures so as to produce a stable and concentric bearing.

I claim:
1. The combination comprising:
   a pair of parts having adjacent surfaces;
   at least one surface having a plurality of spaced pressure pads therein;
   a positive displacement flow dividing and proportioning apparatus comprising:
      a plurality of intercoupled pump motors;
      said pump motors having a common inlet;
      each of said pump motors having a separate outlet;
      said outlets being connected respectively to the pressure pads; and
      means for supplying fluid under pressure to said common inlet.
2. The combination set forth in claim 1 wherein each said pump motor comprises a gear pump, corresponding gears of said gear pumps being interconnected.
3. The combination set forth in claim 1 including an additional pump motor associated with said apparatus and intercoupled with the other pump motors, the outlet of said additional pump motor being connected to drain.
4. The combination set forth in claim 1 wherein a plurality of pressure pads are connected to a single outlet of one of said pump motors.
5. The combination set forth in claim 1 wherein at least two groups of pressure pads are interconnected to the respective outlets of two of said pump motors.
6. The combination set forth in claim 1 wherein said surfaces comprise complementary cylindrical surfaces, said pressure pads being circumferentially spaced in one of said surfaces.
7. The combination set forth in claim 6 wherein said surfaces include complementary radial surfaces, some of said pressure pads being circumferentially spaced in one of said radial surfaces.
8. The combination set forth in claim 7 wherein said circumferentially spaced pads in one of said radial surfaces are connected to the outlet of one of said pump motors only.
9. The combination set forth in claim 8 including a restrictor associated with each said pad of said circumferentially spaced pads.
10. The combination set forth in claim 1 wherein the sizes of said pump motors vary in accordance with the spacing of the associated pressure pad from the surface of the other part.
11. The combination comprising:
    a pair of parts having adjacent surfaces;
    at least one surface having a plurality of spaced pressure pads therein;
    a positive displacement flow dividing and proportioning apparatus comprising:
       a plurality of intercoupled pump motors;
       said pump motors comprising gear pumps;
       corresponding gears of said gear pumps being interconnected;
       said pump motors having a common inlet;
       each of said pump motors having a separate outlet;
       said outlets being connected respectively to the pressure pads; and
       means for supplying fluid under pressure to said common inlet.
12. The combination set forth in claim 11 including an additional pump motor associated with said apparatus and intercoupled with the other pump motors, the outlet of said additional pump motor being connected to drain.
13. The combination set forth in claim 11 wherein a plurality of pressure pads are connected to a single outlet of one of said pump motors.
14. The combination set forth in claim 11 wherein at least two groups of pressure pads are interconnected to the respective outlets of two of said pump motors.
15. The combination set forth in claim 11 wherein said surfaces comprise complementary cylindrical surfaces, said pressure pads being circumferentially spaced in one of said surfaces.
16. The combination set forth in claim 15 wherein said surfaces include complementary radial surfaces, some of said pressure pads being circumferentially spaced in one of said radial surfaces.
17. The combination set forth in claim 16 wherein said circumferentially spaced pads in one of said radial surfaces are connected to the outlet of one of said pump motors only.
18. The combination set forth in claim 17 including a restrictor associated with each said pad of said circumferentially spaced pads.
19. The combination set forth in claim 11 wherein the sizes of said pump motors vary in accordance with the spacing of the associated pressure pad from the surface of the other part.
20. The combination set forth in claim 19 including a flow control valve associated with at least one of said pump motors.